United States Patent [19]

Lamb

[11] Patent Number: 6,112,079
[45] Date of Patent: Aug. 29, 2000

[54] METHOD AND APPARATUS FOR PROVIDING FRAUD PROTECTION MEDIATION IN A MOBILE TELEPHONE SYSTEM

[75] Inventor: James A. Lamb, Elkhorn, Nebr.

[73] Assignee: Tandem Computers, Inc., Cupertino, Calif.

[21] Appl. No.: 09/225,176

[22] Filed: Jan. 4, 1999

Related U.S. Application Data

[62] Division of application No. 08/781,264, Jan. 11, 1997.

[51] Int. Cl.[7] .......................... H04M 1/66; H04M 1/68; H04M 3/16; H04M 11/10; H04Q 7/20
[52] U.S. Cl. .......................... 455/411; 455/456; 380/21
[58] Field of Search .................................. 455/411, 456; 380/21

[56] References Cited

U.S. PATENT DOCUMENTS

| | | |
|---|---|---|
| 4,799,061 | 1/1989 | Abraham et al. . |
| 4,930,150 | 5/1990 | Katz ......................................... 379/93 |
| 5,014,298 | 5/1991 | Katz ......................................... 379/93 |

(List continued on next page.)

FOREIGN PATENT DOCUMENTS

| | | |
|---|---|---|
| WO 93 11646 | 6/1993 | European Pat. Off. ......... H04Q 7/04 |
| 0604911 | 7/1994 | European Pat. Off. . |
| 0 613 280 A1 | 8/1994 | European Pat. Off. . |
| 0690648 A2 | 1/1996 | European Pat. Off. . |
| 0 715 475 A2 | 6/1996 | European Pat. Off. . |

(List continued on next page.)

OTHER PUBLICATIONS

S. Mohan, "Network Impacts of Privacy and Authentication Protocols for PCS", Proceedings of the Conference on Communications, Jun. 18–22, 1995, Seattle, WA, IEEE, vol. 3, pp. 1557–1561.

"Find Me Now," Cellular One Service User Guide, Apr. 1994, pp. 1–8.

Article by K. A. Holley entitled, "Global System for Mobile Communications—What's In Store?", published by BT Technology Journal, vol. 14, No. 3, Jul. 1996, pp. 47–54.

Kaczmarek, K. W.; Cellular Networking A Carrier's Perspective; 1989 IEEE; pp. 1–6.

Wey, J–K. et al.; Clone Terminator: An Authentication Service for Advanced Mobile Phone System; 1995 IEEE; pp. 175–179.

Article by Wey, Jyhi–Kong et al., "Clone Terminator: An Authentication Service for Advanced Mobile Phone System," Institute of Electrical and Electronics Engineers Conference: Vehicular Technology, Chicago, Jul. 25–28, 1995, vol. 1, No. CONF. 45, Jul. 25, 1995, pp. 175–179.

Article by Kaczmarek, Keith W., "Cellular Networking: A Carrier's Perspective," Institute of Electrical and Electronics Engineers Conference: Gateway to New Concepts in Vehicular Technology, San Francisco, May 1–3, 1989, vol. 1, No. CONF. 39, May 1, 1989, pp. 1–6.

*Primary Examiner*—William Cumming
*Attorney, Agent, or Firm*—Fenwick & West LLP

[57] ABSTRACT

The system and method of the present invention facilitates an improved Home Location Register (HLR) that includes a fraud protection mediation module for use in a mobile telephone system. The fraud protection mediation module operates in any one of the following situations: (1) a registration notice (REGNOT) is received by the HLR from a Mobile Switching Center (MSC) currently serving a subscriber in a roaming area; (2) a qualification request (QUALREQ) is received by the HLR from a serving MSC for obtaining a subscriber's profile; and (3) the HLR sends a qualification directive to a serving MSC, with the updated or modified profile of the subscriber. By using the improved HLR of the present invention, a carrier may have the HLR bypass the fraud protection processing in areas that support authentication processing to provide convenience to the subscribers so that they do not have to enter their PINs to use their cellular phones. Alternatively, if authentication processing is available, the cellular carrier may use fraud protection processing as a backup protection measure.

3 Claims, 8 Drawing Sheets

U.S. PATENT DOCUMENTS

| | | | |
|---|---|---|---|
| 5,048,075 | 9/1991 | Katz | 379/92 |
| 5,077,790 | 12/1991 | D'Amico et al. | |
| 5,091,942 | 2/1992 | Dent | |
| 5,128,984 | 7/1992 | Katz | 379/92 |
| 5,153,902 | 10/1992 | Buhl et al. | |
| 5,204,902 | 4/1993 | Reeds, III et al. | |
| 5,210,787 | 5/1993 | Hayes et al. | 455/432 X |
| 5,237,612 | 8/1993 | Raith | |
| 5,243,645 | 9/1993 | Bissell et al. | 379/211 |
| 5,282,250 | 1/1994 | Dent et al. | |
| 5,309,501 | 5/1994 | Kozik et al. | |
| 5,329,578 | 7/1994 | Brennan et al. | |
| 5,371,781 | 12/1994 | Ardon | 455/445 |
| 5,406,619 | 4/1995 | Akhteruzzaman et al. | |
| 5,418,835 | 5/1995 | Frohman et al. | 455/413 |
| 5,448,622 | 9/1995 | Huttunen | 455/567 X |
| 5,455,863 | 10/1995 | Brown et al. | |
| 5,497,412 | 3/1996 | Lannen et al. | |
| 5,504,804 | 4/1996 | Widmark et al. | 455/414 |
| 5,513,545 | 5/1996 | Mizikovsky et al. | |
| 5,524,135 | 6/1996 | Mizikovsky et al. | |
| 5,530,736 | 6/1996 | Comer et al. | 45/567 X |
| 5,533,107 | 7/1996 | Irwin et al. | |
| 5,551,073 | 8/1996 | Sammarco | |
| 5,553,120 | 9/1996 | Katz | 379/88 |
| 5,590,175 | 12/1996 | Gallant et al. | 379/58 |
| 5,592,541 | 1/1997 | Fleischer, III et al. | 379/211 |
| 5,594,740 | 1/1997 | LaDue | |
| 5,600,704 | 2/1997 | Ahlberg et al. | 379/58 |
| 5,603,081 | 2/1997 | Raith et al. | |
| 5,615,267 | 3/1997 | Lin et al. | |
| 5,642,401 | 6/1997 | Yahagi | |
| 5,668,875 | 9/1997 | Brown et al. | |
| 5,673,308 | 9/1997 | Akhavan | 455/417 |
| 5,708,710 | 1/1998 | Duda | 380/21 |
| 5,724,417 | 3/1998 | Bartholomew et al. | 379/211 |
| 5,727,057 | 3/1998 | Emery et al. | 455/456 |
| 5,737,701 | 4/1998 | Rosenthal et al. | |
| 5,754,952 | 5/1998 | Hodges et al. | |
| 5,754,955 | 5/1998 | Ekbatani | |
| 5,761,500 | 6/1998 | Gallant et al. | |
| 5,793,859 | 8/1998 | Matthews | 455/417 X |
| 5,794,139 | 8/1998 | Mizikovsky et al. | |
| 5,794,142 | 8/1998 | Vanttila et al. | |
| 5,822,691 | 10/1998 | Hosseini | |
| 5,875,394 | 2/1999 | Daly et al. | |
| 5,878,126 | 3/1999 | Velamuri et al. | |
| 5,887,251 | 3/1999 | Fehnel | |
| 5,937,068 | 8/1999 | Audebert | |
| 5,943,425 | 8/1999 | Mizikovsky | |

FOREIGN PATENT DOCUMENTS

| | | |
|---|---|---|
| 0 738 095 A2 | 10/1996 | European Pat. Off. |
| 196 17 798 A1 | of 0000 | Germany |
| WO 93/21715 | 10/1993 | WIPO |
| WO 94/06236 | 3/1994 | WIPO |
| 94 29992 | 12/1994 | WIPO |
| WO 96/07286 | 3/1996 | WIPO |
| WO97/01231 | 1/1997 | WIPO |
| 98 05173 | 2/1998 | WIPO |
| WO 98/26620 | 6/1998 | WIPO |

| Case | fp-act (SUBS) | can-isac (Computed) | can-fp (MPCM) | bypass-fp (SYSP) | isac | fp |
|---|---|---|---|---|---|---|
| 1 | 0 | 0 | 0 | 0 | 0 | 0 |
| 2 | 0 | 0 | 0 | 1 | 0 | 0 |
| 3 | 0 | 0 | 1 | 0 | 0 | 0 |
| 4 | 0 | 0 | 1 | 1 | 0 | 0 |
| 5 | 0 | 1 | 0 | 0 | 1 | 0 |
| 6 | 0 | 1 | 0 | 1 | 1 | 0 |
| 7 | 0 | 1 | 1 | 0 | 1 | 0 |
| 8 | 0 | 1 | 1 | 1 | 1 | 0 |
| 9 | 1 | 0 | 0 | 0 | 0 | 0 |
| 10 | 1 | 0 | 0 | 1 | 0 | 0 |
| 11 | 1 | 0 | 1 | 0 | 0 | 1 |
| 12 | 1 | 0 | 1 | 1 | 0 | 1 |
| 13 | 1 | 1 | 0 | 0 | 1 | 0 |
| 14 | 1 | 1 | 0 | 1 | 1 | 0 |
| 15 | 1 | 1 | 1 | 0 | 1 | 1 |
| 16 | 1 | 1 | 1 | 1 | 1 | 0 |

FIG. 6

METHOD AND APPARATUS FOR PROVIDING FRAUD PROTECTION MEDIATION IN A MOBILE TELEPHONE SYSTEM

This application is a division of U.S. application Ser. No. 08/781,264, allowed of James A. Lamb, filed Jan. 11, 1997.

RELATED APPLICATIONS

The following applications are related to the subject application. Each of the following applications is incorporated by reference herein.

1. U.S. application Ser. No. 08/781,262 entitled "Method and Apparatus for Providing Switch Capability Mediation in a Mobile Telephone System," of Lamb et al., filed Jan. 11, 1997 now U.S. Pat. No. 6,026,298;

2. U.S. application Ser. No. 08/781,259 pending entitled "Method and Apparatus for Implementing Alias Mobile ID Numbers in a Mobile Telephone System," of Lamb, filed Jan. 11, 1997;

3. U.S. application Ser. No. 08/781,261 pending entitled "Method and Apparatus for Implementing Configurable Call Forwarding Bins in a Mobile Telephone System," of Lamb, filed Jan. 11, 1997;

4. U.S. application Ser. No. 08/781,260 allowed entitled "Method and Apparatus for Automated SSD Updates on an A-Key Entry In a Mobile Telephone System," of Jacobs, filed Jan. 11, 1997;

5. U.S. application Ser. No. 08/780,830 pending entitled "Method and Apparatus for Configuration of Authentication Center Operations Allowed by MSCID in a Mobile Telephone System," of Jacobs et al., filed Jan. 11, 1997;

6. U.S. application Ser. No. 08/781,258 pending entitled "Method and Apparatus for Configuration of Authentication Center Operations Allowed by System Access Type in a Mobile Telephone System," of Jacobs, filed Jan. 11, 1997;

7. U.S. application Ser. No. 08/781,263 pending entitled "Method and Apparatus for Authentication Directive Initiation Limits in a Mobile Telephone System," of Jacobs, filed Jan. 11, 1997.

BACKGROUND OF THE INVENTION

The invention generally relates to a wireless communication network, and more particularly, relates to an improved home location register (HLR) that provides fraud protection mediation in a wireless communication network.

Wireless communication is one of the fastest growing segments of the telecommunication industry. With the mobility of the wireless devices, such as cellular phones and pagers, a subscriber to a wireless service can make or receive a call or receive a message without being restricted to any particular locations. Because of the convenience provided by wireless devices, they have been widely used by average consumers.

Wireless communications are provided through a wireless communication network, which can be realized, for example, as a Signaling System 7 (SS7) network. The SS7 network uses the EIA/TIA Interim Standard 41 (IS-41) protocol, which is the standard commonly used in North America. A description of the SS7 network and the IS-41 protocol can be found in Signaling System #7, by Travis Russell, and The Mobile Communications Handbook, by Jerry Gibson, which are hereby incorporated by reference.

The SS7 network is used for switching data messages pertaining to connecting telephone calls and for maintaining the signaling network. As shown in FIG. 1, the SS7 network 100 has three different types of nodes or signaling points: Service Switching Point (SSP) 112, Signal Transfer Point (STP) 116, and Service Control Point (SCP) 122.

An SSP 112 is an local exchange in the telephone network. An SSP 112 uses the information provided by the calling party (such as dialed digits) and determines how to connect the call. An STP 116 serves as a router in the SS7 network and switches SS7 messages as received from the various SSPs 112 through the network to their appropriate destinations. An STP 116 receives messages in packet form from an SSP 112. These packets are either related to call connections or database queries for an SCP 122. If the packet is a request from an SSP 112 to connect a call, the message must be forwarded to the destination where the call will be terminated. The destination is determined by the dialed digits. If the message is a database query seeking additional information regarding a person who subscribes a wireless service, i.e., a "subscriber", the destination will be a database. Access to telephone company databases is provided through an SCP 122. These databases are used to store information about subscribers' services, calling card validation, fraud protection, etc.

As shown in FIG. 1, the wireless network is shared by multiple regions 126, such as regions A and B. In each region 126, an SCP 122 is provided. Each region 126 is further divided into a number of registration areas 132, each of which is served by a Mobile Switching Center (MSC) 136. An MSC 136 provides wireless communication services to all properly registered cellular phones 142 in the registration area.

As illustrated in FIG. 1, an SCP 122 contains an authentication center (AC) 146 and a home location registers (HLR) 152. AC 146 authenticates a subscriber's cellular phone through the use of an encrypted number called the A-Key. HLR 152 is used to store information regarding cellular subscribers in the region for which it provides services. HLR 152 also stores information identifying the services allowed for each subscriber. In addition to these, HLR 152 stores the current locations of cellular phones 142 of those subscriber's who initially activated their cellular phones through a wireless service provider in the region the HLR serves. This region is also referred to as the "home area" of those subscribers. Although not shown, a backup HLR is also provided in SCP 122.

A visitor location register (VLR) 156 is also provided in each region 126. VLR 156 is used when a cellular phone 142 is not recognized by a local MSC. VLR 156 stores the current locations for the visiting subscribers.

With the unparalleled growth of wireless communications services has come an equally noteworthy but unfortunate trend. Cellular fraud—the theft of cellular airtime by criminals employing a variety of methods—has become an enormous business challenge for cellular carriers and a nuisance for legitimate cellular subscribers. In the United States alone, industry estimates of lost revenue attributed to unauthorized use of cellular networks range from US$1 million to close to US$3 million per day. Carriers' ability to detect cellular fraud, manage it, and to the extend they can, prevent it has become critical to sustaining both profitability and competitive advantage.

HLR-based fraud protection feature has been implemented by automatically locking cellular phones when they are inactive. This prevents unauthorized use of a subscriber's phone and/or fraudulent access to the network by cloned phones. When a subscriber initially registers with the network, the HLR requires the subscriber to enter a feature code and personal identification number (PIN) before access is granted. The subscriber can then lock the phone again by entering the same feature code and PIN. If an unlocked phone becomes inactive for a predetermined period of time, the HLR automatically invokes the fraud protection feature until the subscriber unlocks the phone with feature code and PIN entries. This feature prevents access to the network by a cloned phone using the valid subscriber's MIN (Mobile ID Number) or ESN (Equipment Serial Number) while the valid subscriber is inactive.

However, in areas where authentication processing operates to authenticate cellular phones, it may not be necessary to operate fraud protection processing which requires a subscriber to enter a PIN to unlock his cellular phone for accessing the network. To provide convenience to subscribers so that they do not have to enter their PINs to use their phones, fraud protection processing should be operated in areas where authentication processing is not available.

Accordingly, fraud protection mediation is needed in different areas that support either authentication processing or fraud protection processing, or both. This will provide great convenience to subscribers in those areas where authentication processing is performed on cellular phones.

SUMMARY OF THE INVENTION

The present invention provides an improved home location register (HLR) that includes a fraud protection mediation module for use in a mobile telephone system. According to the invention, the fraud protection mediation module operates in any one of the following situations: (1) a registration notice (REGNOT) is received by the HLR from an MSC currently serving a subscriber in a roaming area; (2) a qualification request (QUALREQ) is received by the HLR from a serving MSC for obtaining a subscriber's profile; and (3) the HLR sends a qualification directive to a serving MSC, with the updated or modified profile of the subscriber. When any of the above situations occurs, the mediation module reads in the HLR the MPCM (MSC ID Point Code Map File) record of the serving MSC to determine whether the area this serving MSC serves supports authentication processing and whether the MSC is fraud capable (i.e., whether the MSC supports fraud protection processing). Then, the mediation module reads the subscriber's profile record in the SUBS file of the HLR to determine if the subscriber has an active authentication and has fraud protection authorized. Next, the mediation module determines whether the fraud protection bypass feature is activated for this HLR. Based on these various information, the mediation modules refers to an AC/FP lookup table to determine the appropriate check or checks that are needed for the subscriber's cellular phone. The mediation module then sends an appropriate request to the conventional components of the HLR for performing the check or checks.

By using the improved HLR of the invention, a carrier may have the HLR bypass the fraud protection processing in areas that support authentication processing to provide convenience to the subscribers so that they do not have to enter their PINs to use their cellular phones. Alternatively, if authentication processing is available, the cellular carrier may use fraud protection processing as a backup protection measure.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an AC/FP lookup table according to the invention;

DETAILED DESCRIPTION OF THE PREFERRED EMBODIMENTS

Figure 2:
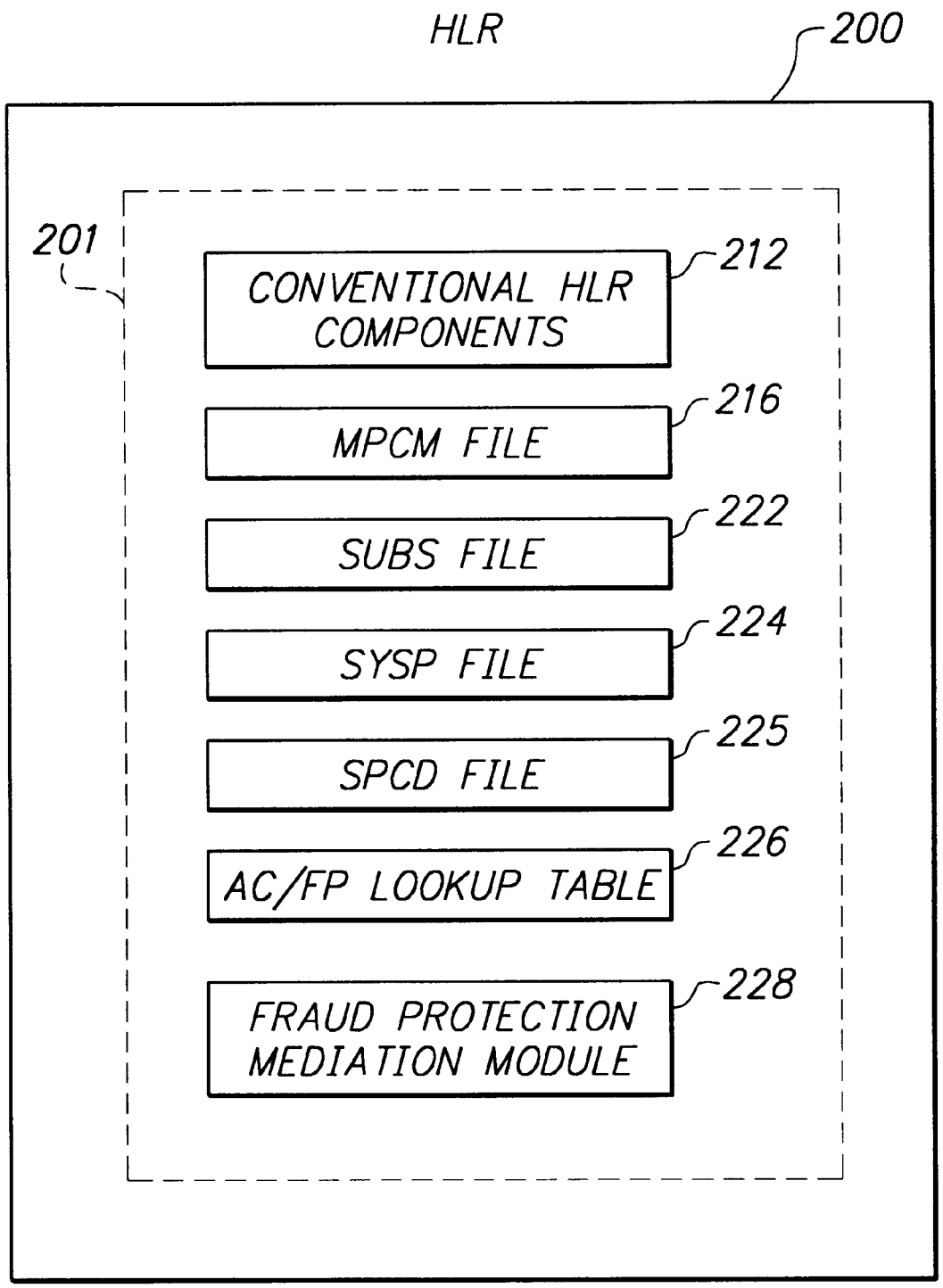
FIG. 2 shows an example of an HLR according to the invention.

FIG. 2 shows home location register (HLR) 200 according to the invention. As shown, HLR 200 includes a computer-readable medium 201 having at least conventional HLR components 212, MPCM file 216, SUBS file 222, SYSP file 224, SPCD file 225, AC/FP lookup table 226 and fraud protection mediation module 228.

MPCM file 216 is the "MSC ID Point Code Map File" which store MSCs' network configuration information. Each MSC communicating to an HLR has a corresponding MPCM file record in the MPCM file of the HLR. SUBS file 222 is the "subscribers' files" which store subscribers' profiles on a per subscriber basis (i.e, information for each cellular phone). Usually one SUBS file in the HLR contains information about all of its home subscribers (i.e., the subscribers who initially activated their cellular phones in the region the HLR serves). SYSP file 224 is the "System Parameters File" which stores global information about how the system should operate. SPCD file 225 is the "Serving Point Code File" which stores the network addresses in the form of point codes for various network components including MSCs. AC/FP lookup table 226 contains information about what fraud protection related process or processes should be performed for any particular subscriber under various conditions. Fraud protection mediation module 228 is an application program that implements fraud protection mediation for a particular subscriber in accordance with AC/FP lookup table 226. It will be understood by persons of ordinary skill in the art that functions performed by the HLR are implemented by a processor 123 executing computer instructions stored in a memory 201.

Figure 3:
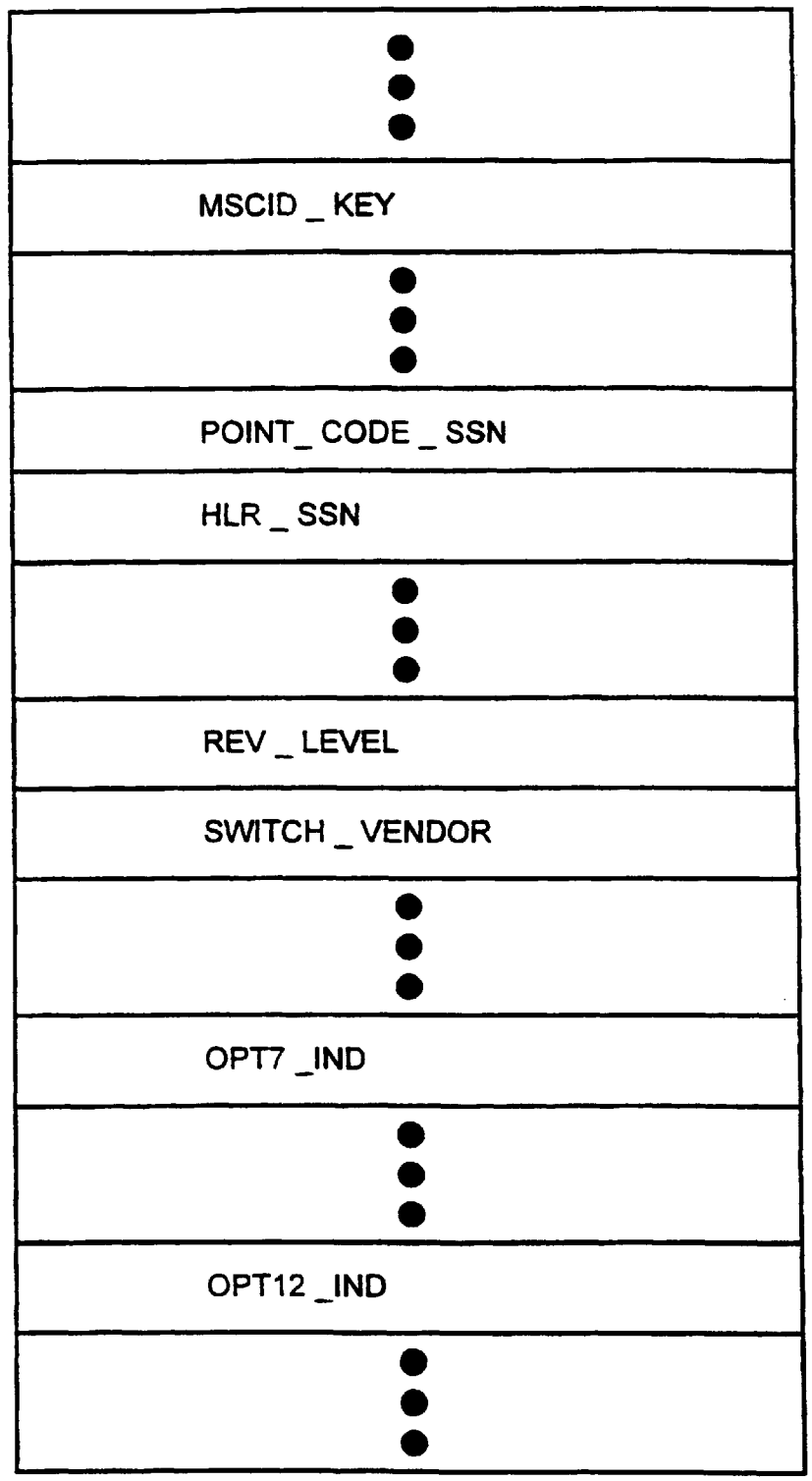
FIG. 3 shows an MPCM file record of an MSC according to the invention.

FIG. 3 illustrates a partial format of an MPCM file record associated with an MSC in MPCM file 216. This file record includes a number of fields. Some of the relevant fields are described below. The MSCID_KEY field identifies this MSC's ID (MSCID) number. It is the primary key to the MPCM files. The POINT_CODE_SSN field identifies the network ID and subsystem (SSN), etc. for this MSC. The HLR_SSN field stores the value the HLR will use as the SSN when communicating with this MSC. The IS-41 revision level of this MSC, e.g., IS-41 Rev A, IS-41 Rev B, etc, is stored in the REV_LEVEL field. Moreover, the vendor of this MSC, e.g., AT&T, Ericsson, Motorola, or Northern Telecom, etc. is identified by SWITCH_VENDOR field. The OPT7_IND field indicates whether the Visitor Location Register (VLR) serving this MSC can perform an authentication (AC) check. The OPT12_IND field indicates whether this MSC is fraud-capable, i.e., whether the HLR can perform a fraud protection (FP) check to a subscriber in the registration area this MSC serves. The FP check requires a subscriber to unlock the phone when the subscriber wants to place a call. The AC and FP checks may be performed for example, through the AC and FP processing software TSCP-AC and TSCP-HLR respectively, both of which are developed by Tandem Telecom in Omaha, Neb.

Figure 4:
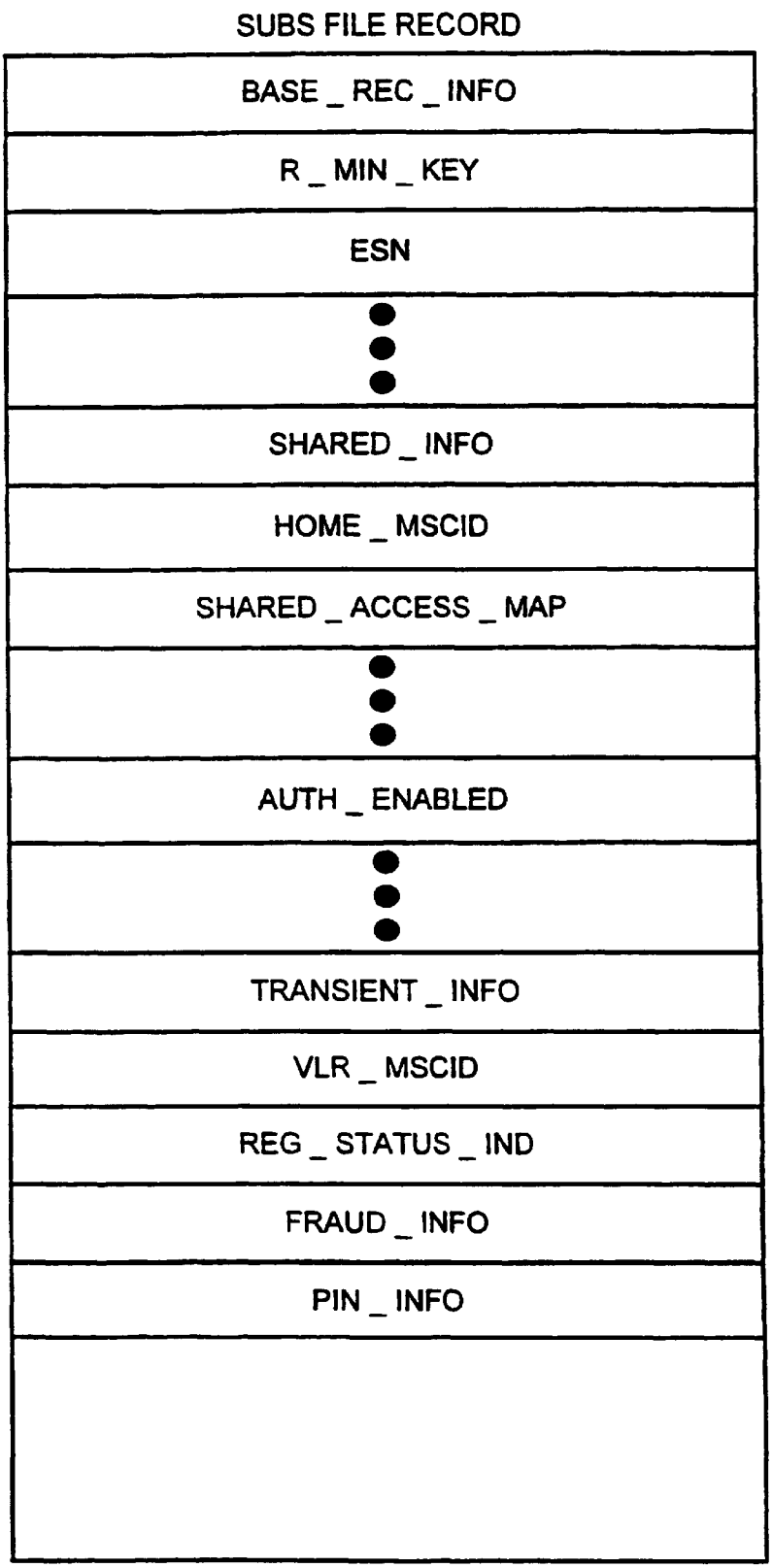
FIG. 4 shows a partial format of a subscriber's profile in a SUBS file of an HLR according to the invention.

FIG. 4 shows a partial format of a subscriber's profile record in SUBS file 222. There are several segments in each subscriber's profile record, including the BASE_REC_INFO, SHARED_INFO, TRANSIENT_INFO, etc. Each segment includes multiple fields. The BASE_REC_INFO segment contains information needed by IS-41 applications to access a subscriber record. This segment includes the R_MIN_KEY, ESN fields, etc. The R_MIN_KEY field is the subscriber file's primary key. It contains the subscriber's MIN (Mobile ID number) stored in reverse byte order. The ESN field is the subscriber file's alternate key. It contains the Equipment Serial Number (ESN) associated with the subscriber's MIN.

The SHARED_INFO segment of a subscriber's profile record stores attributes common to the IS-41 applications. This segment includes the HOME_MSCID, SHARED_ACCESS_MAP, AUTH_ENABLED fields, etc. The HOME_MSCID field identifies the ID number of the MSC that is in the subscriber's home area where the subscriber initially activates his cellular phone. The SHARED_ACCESS_MAP field is a bitmap identifying the IS-41 applications currently accessing the subscriber's data. The AUTH_ENABLED field identifies whether or not authentication is enabled and should be performed for this subscriber.

The TRANSIENT_INFO segment of a subscriber's profile record stores the registration information about this subscriber. This segment includes the VLR_MSCID, REG_STATUS_IND fields, etc. The VLR_MSCID field identifies the MSCID of the VLR in a roaming area where the subscriber is currently registered. The REG_STATUS_IND field identifies the subscriber's registration status. This field stores the information relating to, e.g., whether the subscriber is registered, whether registration is active in the home area, and whether the registration is active in the roaming area.

The FRAUD_INFO segment of a subscriber's profile record indicates whether or not fraud protection (i.e., FP check) is authorized for this subscriber. The PIN_INFO segment stores the subscriber's personal identification number (PIN).

Figure 5:
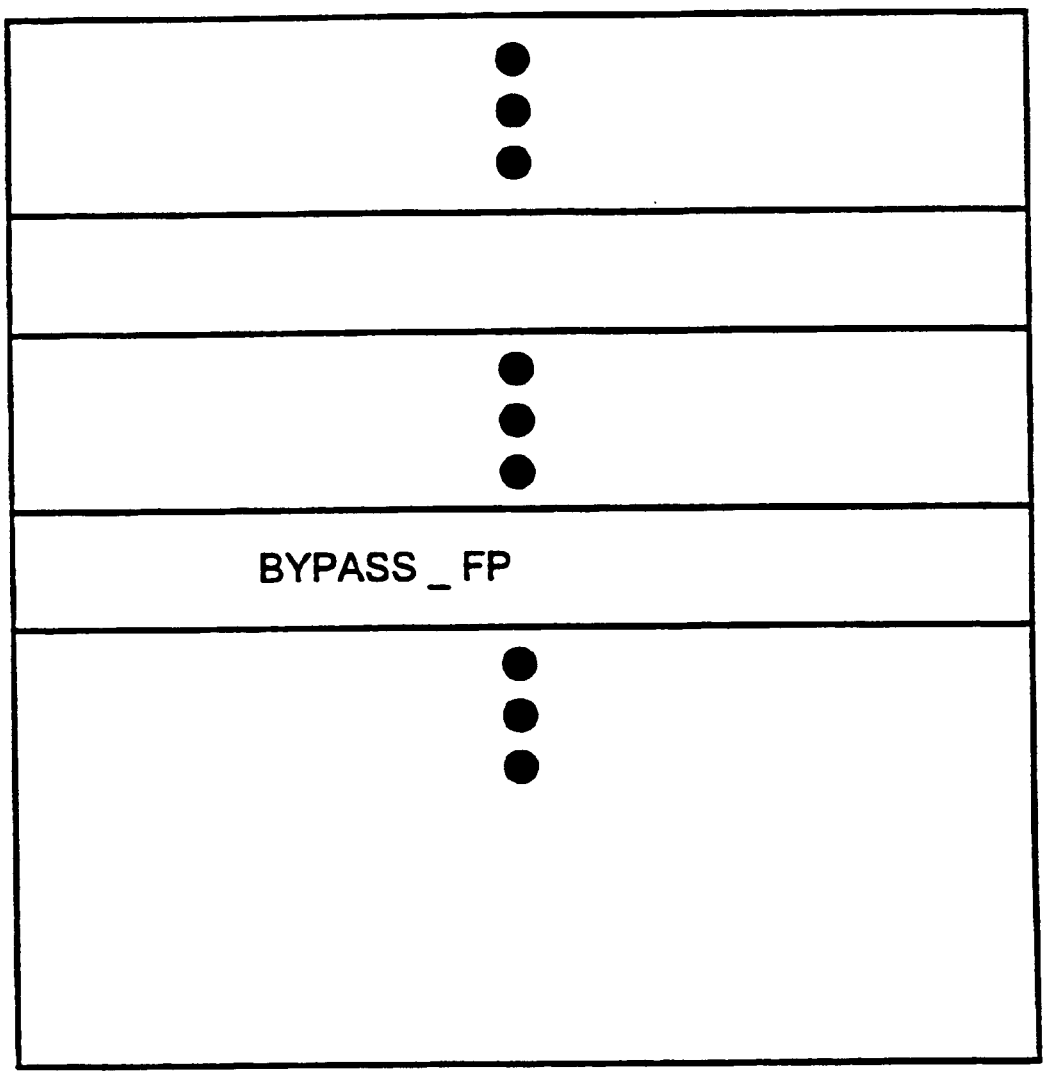
FIG. 5 shows an example of an SYSP file of an HLR according to the invention.

FIG. 5 shows a partial format of SYSP file 224 of the HLR. The BYPASS_FP field indicates whether the fraud protection bypass feature is activated for this HLR. If this feature is activated, then no FP check will be performed by this HLR when authentication processing is available.

FIG. 6 shows AC/FP look up table 226 of the HLR. This table is referenced for determining whether an AC check or an FP check or both checks are needed in each of the 16 cases identified by the case field. The fp-act field indicates whether the fraud protection for a particular subscriber is authorized. The information is stored in the FRAUD_INFO field of the subscriber's profile record in the SUBS file. The can-isac field is determined based on the information of whether the subscriber has an active authentication and whether the area the subscriber is in supports AC processing.

If any one of the two conditions is not true, the can-isac is inactive and stores a zero. The can-isac is active and stores 1, only when both the subscriber has an active authentication and the area the subscriber is in supports AC processing. The information of whether the subscriber has an active authentication is stored in the AUTH_ENABLED field of the subscriber's profile record in the SUBS file. The information about whether the area supports AC processing is stored in the OPT7_IND field of the MPCM file record associated with an MSC currently serving the subscriber. The can-fp field identifies whether the serving MSC is fraud capable. This information is stored in the OPT12_IND field of the MPCM file record of the serving MSC. The bypass-fp indicates whether the fraud protection bypass feature is activated for this HLR. This information is stored in the BYPASS_FP field in the HLR's SYSP file. Finally, the isac field indicates whether an AC check should be performed on this subscriber's cellular phone; and the fp field indicates whether an FP check should be performed on this subscriber's cellular phone.

As shown in this lookup table, if the can-isac is inactive, i.e., either the subscriber does not have an active authentication or the area the subscriber is in does not support AC processing, as in cases 1–4 and 9–12, then an AC check will not be performed. In these cases, however, if the fraud protection is authorized (i.e., the fp-act is active) and the MSC is fraud capable (i.e., the can-fp is active), as in cases 11 and 12, then an FP check will be performed regardless of whether the bypass-fp is active or inactive (i.e., regardless of whether the fraud protection bypass feature is activated or not). However, if the can-isac is active, i.e., the subscriber has an active authentication and the area the subscriber is in supports AC processing, as in cases 5–8 and 13–16, then an AC check will always be performed. In these cases, if the fraud protection is also authorized (i.e., the fp-act is active) and the serving MSC is fraud capable (i.e., the can-fp is active), as in cases 15 and 16, then an FP check will be performed only if the bypass-fp is inactive as in case 15. If the bypass-fp is active, as in case 16, then an FP check will be bypassed and only an AC check will be performed. In this way, an AC check is performed whenever the subscriber has an active authentication and the area the subscriber is in supports AC processing. An FP check may be used as a backup protection. Alternatively, a cellular carrier may bypass the FP check in areas that support AC processing to provide convenience to the subscribers so that they do not have to enter their PINs to use their cellular phones.

The present invention can be best understood by the working example described below.

Figure 1:
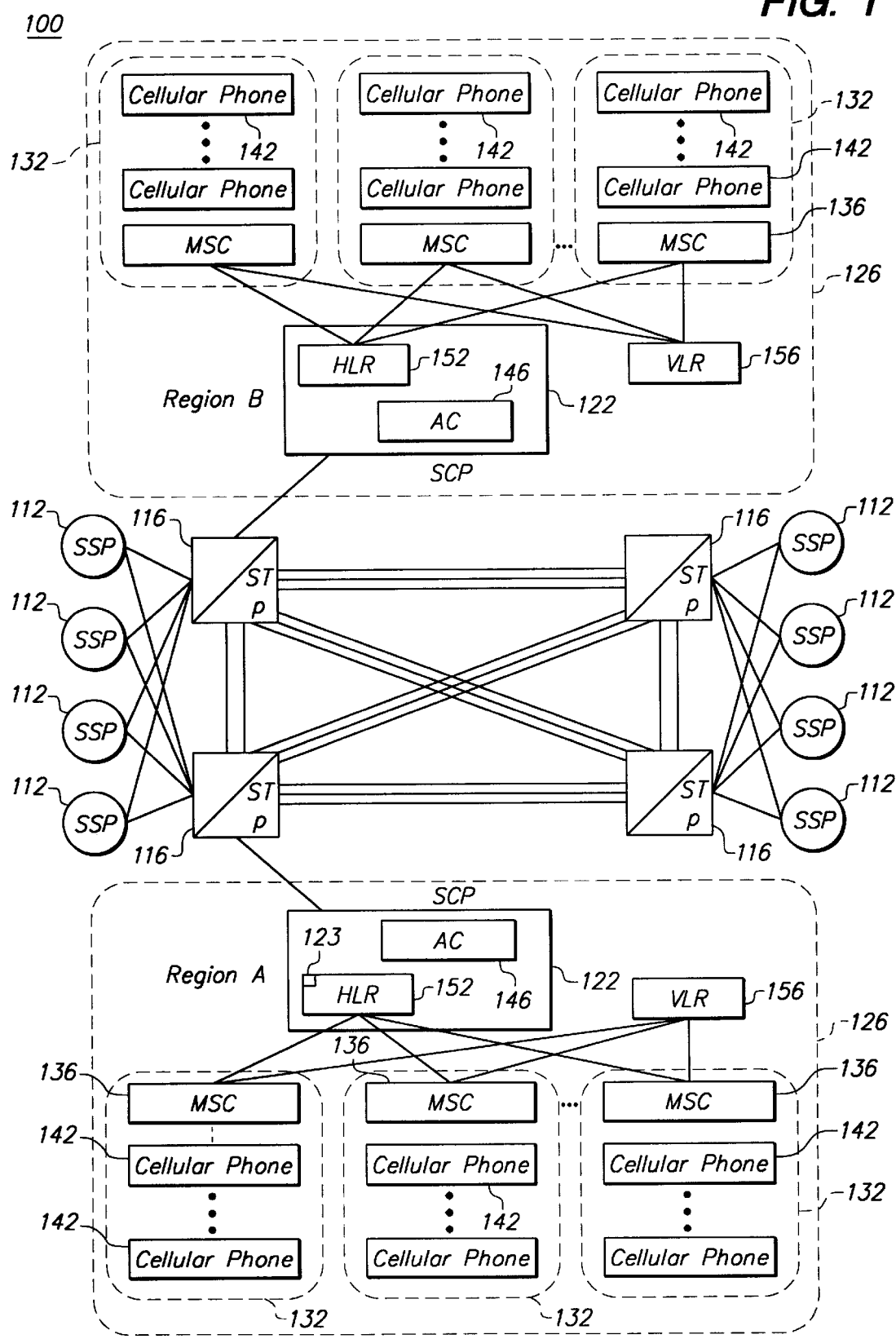
FIG. 1 depicts a typical SS7 mobile communication network.
Figure 7:
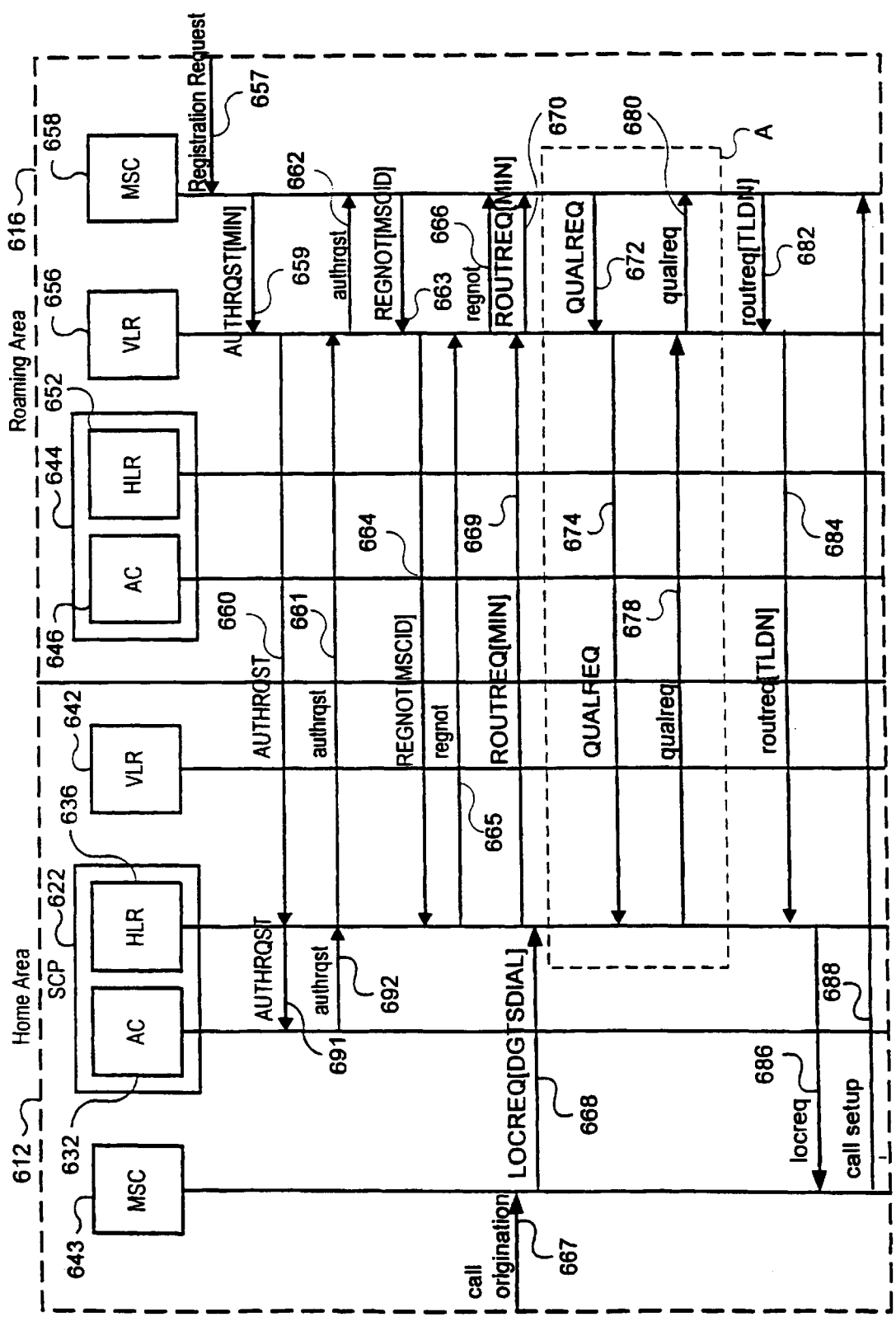
FIG. 7 shows a flow diagram illustrating a registration process and call delivery when the receiving party's cellular phone is outside its home area in a roaming area.

FIG. 7 illustrates how call delivery is made to a cellular phone that is outside its home area 612 in a roaming area 616. Home area 612 and roaming area 616 correspond to two regions, such as regions A and B, respectively, shown in FIG. 1. In home area 612, an SCP 622 and a VLR 642 are provided. SCP 622 includes an AC 632 and an HLR 636. A home MSC 643 is located in home area 612. In roaming area 616, an SCP 644 and a VLR 656 are provided. SCP 644 includes an AC 646 and an HLR 652. A serving MSC 658 is located in roaming area 616. In FIG. 7, although MSCs are shown as separate entities from the HLR and VLR in the respective areas, in a real application the HLR/VLR functions may be integrated with the MSCs.

In this example, when the subscriber enters roaming area 616, his cellular phone sends a registration request containing its MIN (Mobile ID number) to serving MSC 658, as illustrated at step 657. At step 659, serving MSC 658 sends an authentication request (AUTHRQST) message to its VLR 656 to authenticate the cellular phone. VLR 656 in turn sends the request to the subscriber's home HLR 636 in home area 612 at step 660, based on the subscriber's MIN. HLR 636 in turn sends the request to AC 632 at step 691. AC 632 then performs authentication processing and sends authrqst response to HLR 636 at step 692, indicating whether the cellular phone is authenticated. HLR 636 in turn sends the authrqst response to VLR 656 at step 661. Assuming the cellular phone is authenticated, VLR 656 so informs serving MSC 658 at step 662. Then, serving MSC 658 sends a registration notification (REGNOT) message to its VLR 656 at step 663. The REGNOT message contains the MSCID of serving MSC 658. VLR 656 in turn sends the REGNOT message to HLR 636 in home area 612 at step 664. Upon receiving the REGNOT message, HLR 636 updates the information in the VLR_MSCID field of the subscriber's profile record in the SUBS file to show new serving MSC 658 and VLR 656.

Moreover, the fraud protection mediation module of HLR 636 uses the MSCID included in the REGNOT message to access the MPCM file record of serving MSC 658 to determine, from the OPT7_IND field, whether the area MSC 658 serves supports AC processing and from the OPT12_IND field, whether MSC 658 is fraud capable. The mediation module also uses the MIN of the subscriber's cellular phone included in the REGNOT message to access the subscriber's profile record in the SUBS file to determine, from the AUTH_ENABLED field, whether the subscriber has an active authentication and from the FRAUD_INFO field, whether the subscriber has fraud protection authorized. The mediation module further reads the SYSP file of HLR 636 to determine whether the BYPASS_FP field is activated. Then, the mediation module refers to the AC/FP lookup table in HLR 636 to determine whether an AC check, an FP check, or both should be performed on the subscriber's cellular phone. After having determined the appropriate check or checks that are needed, the mediation module sends an appropriate request to the conventional components of HLR 636 to perform the check or checks on the subscriber's cellular phone.

Then, HLR 636 sends a regnot response back to VLR 656 at step 665, which contains relevant parts of the subscriber's profile record from the SUBS file of HLR 636. VLR 656 stores the subscriber's profile in its database and sends the regnot response to serving MSC 658 with the relevant parts of the subscriber's profile at step 666. After step 666, the roaming subscriber is registered in this new roaming area.

When a calling party places a call to this roaming subscriber (also referred to as "receiving party"), as illustrated in FIG. 7, a call origination and the dialed digits are received by home MSC 643 at step 667. MSC 643 is thus also referred to as originating MSC. Then, at step 668, originating MSC 643 sends a location request (LOCREQ) message to HLR 636 in home area 612 of the receiving party. The LOCREQ message contains the dialed digits and other relevant information. Upon receiving the dialed digits, HLR 636 accesses the SUBS file in the HLR using the received dialed digits (which is typically the MIN of a cellular phone) as the key to locate the receiving party's profile record to determine if the receiving party is a legitimate subscriber.

If receiving party is a legitimate subscriber, then at step 669, HLR 636 sends a routing address request (ROUTREQ) message to VLR 656 in roaming area 616. The ROUTREQ message contains the MIN of the receiving party's cellular phone. VLR 656 then forwards the ROUTREQ message to serving MSC 658 at step 670. In response to the ROUTREQ message, serving MSC 658 consults its internal data structures to determine if it knows the receiving party's cellular phone and whether the phone is already engaged in a call on this MSC. Here, if the subscriber did not register his cellular phone with serving MSC 658 initially, i.e., if step 657 to step 666 have not been performed on the receiving party's cellular phone at the time a call origination is received, then serving MSC 658 would not recognize the receiving party's cellular phone. In such a case, step 672 to step 680 as outlined in box A will be performed. In such case, serving MSC 658 may obtain the receiving party's profile from its VLR 656 by sending it a qualification request (QUALREQ) message at step 672. If the cellular phone is also unknown to VLR 656 or if the information requested is not available at VLR 656, VLR 656 sends the QUALREQ message to HLR 636 in home area 612 at step 674. The QUALREQ message typically contains the MSCID of serving MSC 658. Upon receiving the QUALREQ message by HLR 636, the fraud protection mediation module of HLR 636 uses the MSCID included in the QUALREQ message to access the MPCM file record of serving MSC 658 to determine, from the OPT7_IND field, whether the area MSC 658 serves supports AC processing and from the OPT12_IND field, whether serving MSC 658 is fraud capable. If the QUALREQ is received without an MSCID, HLR 636 will read the SPCD file in the HLR to obtain the default MSCID for serving MSC 658. The mediation module also uses the MIN of the receiving party cellular phone included in the AUTHRQST message to access the receiving party's profile record in the SUBS file to determine, from the AUTH_ENABLED field, if the subscriber has an active authentication. The mediation module further reads the SYSP file of HLR 636 to determine if the BYPASS_FP is activated. Then, the mediation module refers to the AC/FP lookup table in HLR 636 to determine whether an AC check, an FP check, or both should be performed on the receiving party's cellular phone. After having determined the appropriate check or checks that are needed, the mediation module sends a request to the conventional components of the HLR 636 to perform the check or checks on the receiving party's cellular phone. Then, HLR 636 sends a qualreq response to VLR 656 at step 678. The qualreq response contains relevant information about the receiving party's profile. VLR 656 in turn sends the qualreq response to serving MSC 658 at step 680. Upon receiving the qualreq response, if the receiving party's cellular is idle, serving MSC 658 allocates a temporary identifier TLDN (Temporary Local Directory Number) and returns this information to VLR 656 in the routreq message at step 682. VLR 656 in turn sends the routreq message to HLR 636 at step 684. When the routreq message is received by HLR 636, it returns a locreq response to originating MSC 643 at step 686. The locreq response includes routing information which includes the MSCID of serving MSC 658 and the TLDN. Finally, originating MSC 643 establishes a voice path to serving MSC 658 using existing interconnection protocols (e.g., SS7) and the routing information specified in the locreq response, as illustrated at step 688. In this way, an FP check may be used as a backup protection. Alternatively, a cellular carrier may have the HLR bypass the FP check in areas that support AC processing to provide convenience to the subscribers so that they do not have to enter their PINs to unlock that cellular phones.

Figure 8:
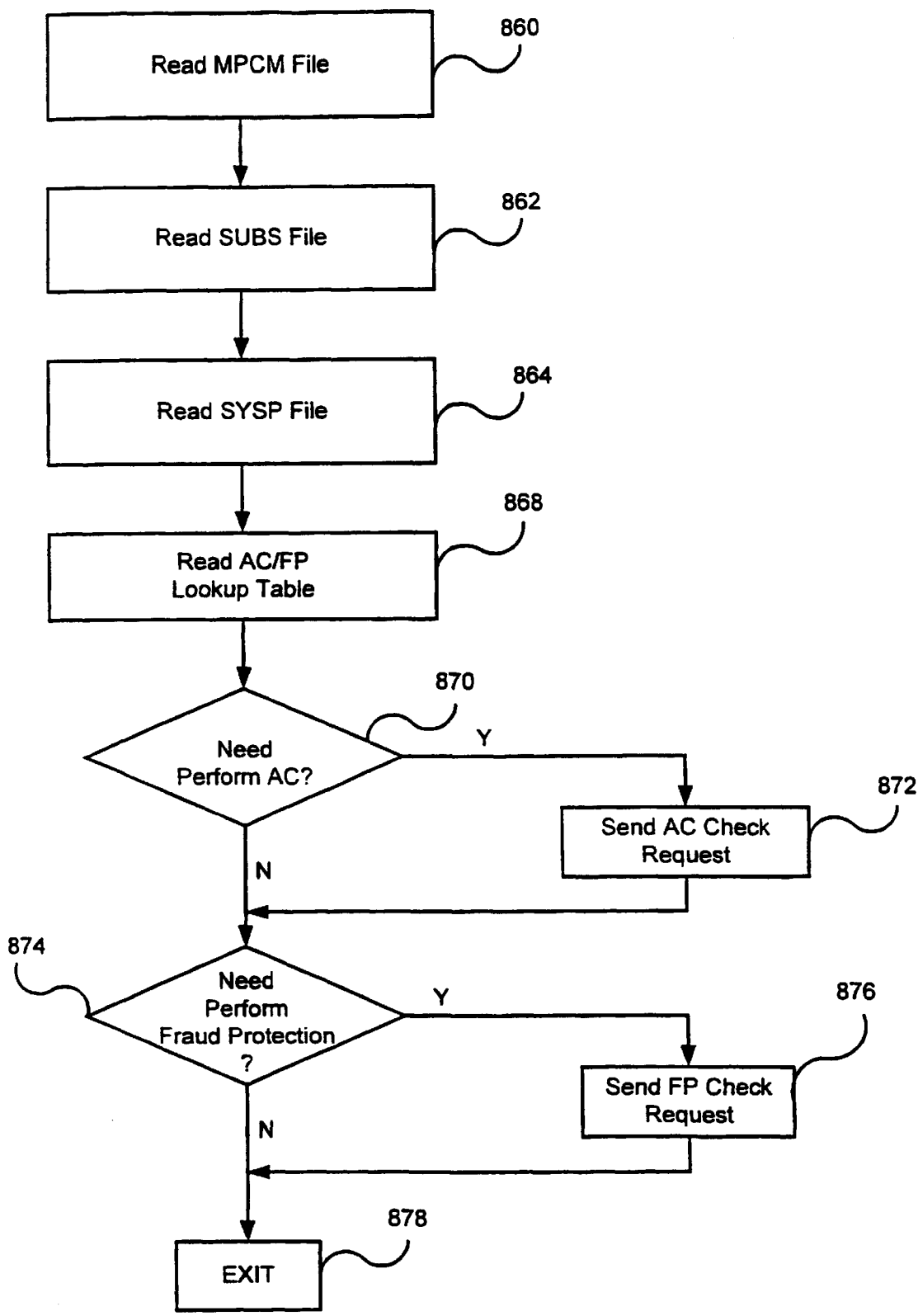
FIG. 8 shows a flow chart of the fraud protection mediation module according to the invention.

FIG. 8 shows a flow chart illustrating the operation of fraud protection mediation module 228. The steps in FIG. 8 are performed by HLR 636 of FIG. 7 although other HLRs are capable of performing these steps. The mediation module implements fraud protection mediation in any of the following situations: (1) a registration notice (REGNOT) is received by the HLR from an MSC currently serving a subscriber's cellular phone; (2) a qualification request is received by the HLR from a serving MSC for obtaining a subscriber's profile; and (3) the HLR sends a qualification directive to a serving MSC, with the updated or modified profile of the subscriber.

In any one of above three situations, the mediation module first reads the MPCM file record of the serving MSC using the MSCID received in the registration notification (REGNOT) message or a qualification request (QUALREQ), for example. If an incoming QUALREQ is received without an MSCID, the HLR will read the SPCD file in the HLR to obtain the default MSCID. From the OPT7_IND field of the MPCM file record, the mediation module determines whether this serving MSC is fraud capable; and from the OPT12_IND field of the MPCM file record, the mediation module determines whether the area this serving MSC serves supports AC processing, as illustrated by step 860. Then, at step 862, the mediation module reads the SUBS file using the subscriber's MIN as key to locate the subscriber's profile record. From the profile record, the mediation module determines whether the subscriber has an active authentication and whether the subscriber has fraud protection authorized, from the AUTH_ENABLED field and the FRAUD_INFO field respectively.

Next, at step 864, the mediation module reads the SYSP file to determine if the fraud protection bypass feature is activated for the HLR. Based on the information retrieved from the various files, the mediation module reads the AC/FP lookup table to determine which case is present, at step 868. The mediation module determines whether an AC check should be performed, based on the isac field in the lookup table, at step 870. If so, the mediation module sends an AC check request to the Authentication Center connected to the HLR to initiate an AC check on the subscriber's cellular phone. Then, the mediation module determines if an FP check should be performed based on the fp field in the lookup table, at step 874. If an AC check is not to be performed, step 872 is bypassed. If the mediation module determines that an FP check should be performed on the subscriber's cellular phone, it sends a fraud protection check request to the conventional components of the HLR to initiate an FP check on this subscriber's cellular phone. If, however, the FP check is not required, the mediation module bypasses step 876 and exits at step 878.

Therefore, by using the improved HLR of the invention, fraud protection processing can be performed as a backup protection. Alternatively, a cellular carrier may have the HLR bypass the fraud protection processing in areas that support AC processing to provide convenience to the subscribers so that PINs are not required for using the cellular phones. In any case, the cellular phones are still protected against fraud.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A computer-readable medium having stored thereon instructions which, when executed by a processor, cause the processor to perform the functions of:
   (a) determining whether an authentication processing can be performed on a subscriber's cellular phone, comprising the functions of:
      (a1) determining whether an area the subscriber is in supports authentication processing by accessing, in the HLR, a Mobile Switching Center ID Point Code Map (MPCM) file record associated with a Mobile Switching Center (MSC) to determine whether the MSC supports the authentication processing, and
      (a2) determining whether the subscriber has an active authentication by accessing a profile record of the subscriber in a SUBS file of the HLR;
   (b) determining whether a fraud protection processing can be performed on the subscriber's cellular phone, comprising the functions of:
      (b1) determining whether the MSC supports the fraud protection processing by accessing the MPCM file record associated with the MSC, and
      (b2) determining whether the subscriber has fraud protection authorized by accessing the profile record of the subscriber;
   (c) determining whether fraud protection processing is bypassed for the HLR;
   (d) performing an authentication check on the subscriber's cellular phone if the authentication processing can be performed on the subscriber's cellular phone; and
   (e) if the authentication check is not performed, performing a fraud protection check on the subscriber's cellular phone if the fraud protection processing can be performed on the subscriber's cellular phone.

2. The computer-readable medium of claim 1 further comprising the function of:
   (f) if the authentication check is performed on the subscriber's cellular phone, performing a fraud protection check on the subscriber's cellular phone if the fraud protection processing can be performed on the subscriber's cellular phone and the fraud protection processing is not bypassed for the HLR.

3. The computer-readable medium of claim 1, wherein function (a) includes the functions of:
   (a1) determining whether an area the subscriber is in supports authentication processing, and
   (a2) determining whether the subscriber has an active authentication; and
   wherein function (b) includes the functions of:
      (b1) determining whether an MSC currently serving the subscriber's cellular phone supports the fraud protection processing, and
      (b2) determining whether the subscriber has fraud protection authorized.

* * * * *